Figure 1:
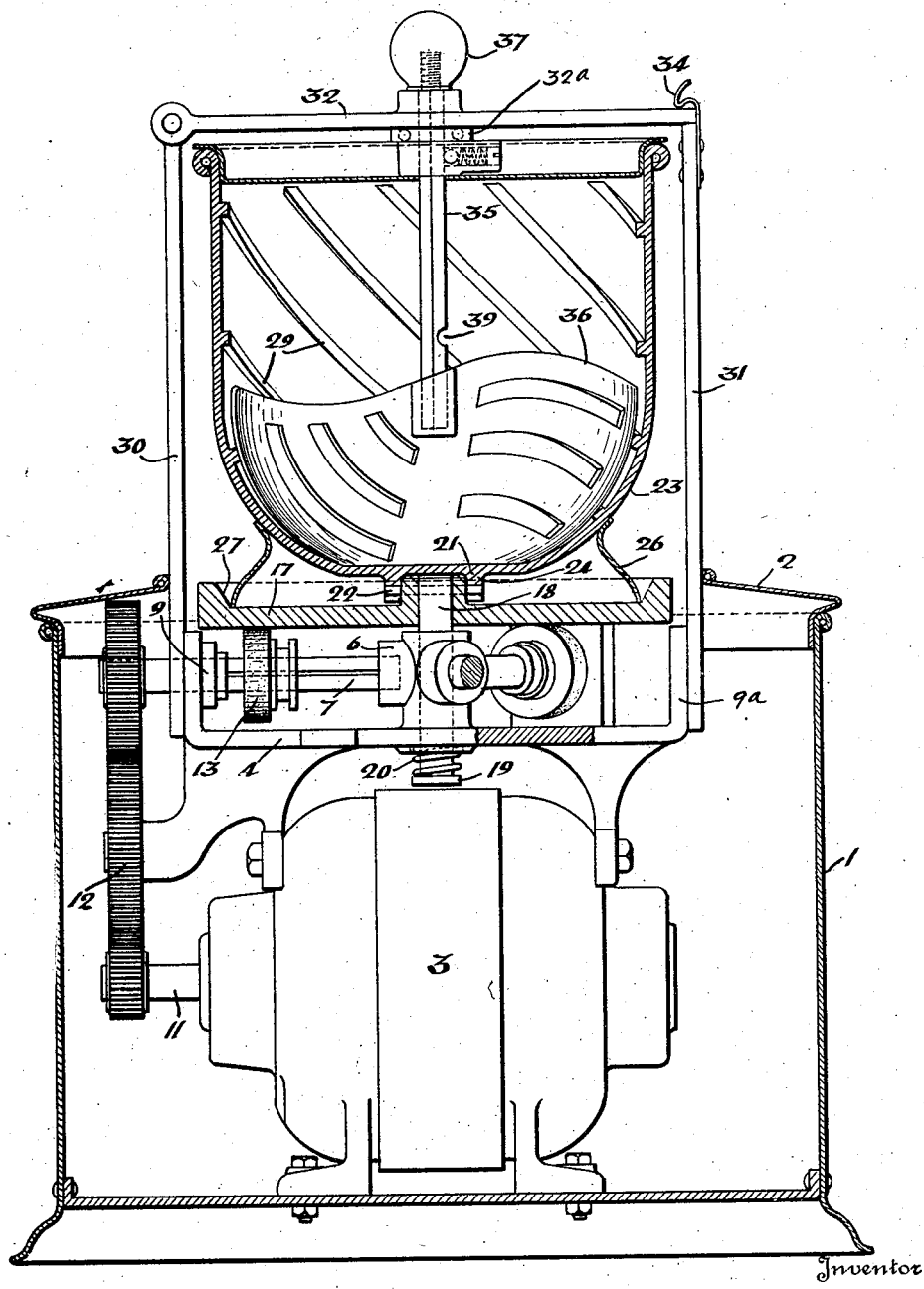

June 3, 1930. J. F. GOETZ 1,762,094
MIXING APPARATUS
Filed June 15, 1928 2 Sheets-Sheet 1

June 3, 1930.　　　　J. F. GOETZ　　　　1,762,094
MIXING APPARATUS
Filed June 15, 1928　　2 Sheets-Sheet 2

Patented June 3, 1930

1,762,094

UNITED STATES PATENT OFFICE

JOSEPH F. GOETZ, OF DAYTON, OHIO, ASSIGNOR TO THE COLUMBIA MIXERS CORPORATION, OF HAMILTON, OHIO, A CORPORATION OF OHIO

MIXING APPARATUS

Application filed June 15, 1928. Serial No. 285,516.

My invention relates to agitators or mixers for mechanically stirring and intermixing materials in either a dry, liquid, or plastic condition, and more particularly to a mixer of the type wherein the vessel or container rotates while the stirring element therein is held stationary.

As disclosed in the drawings, the mixer comprises a rotating table, motor driven at variable speeds by adjustable friction drive wheel movable toward and from the center of rotation of the table, on which table is detachably engaged a mixing bowl or vessel rotating in unison with the table. This bowl or vessel is provided with internal inclined helical ribs or beads which have a driving and also an elevating or depressing effect upon the mass of material within the vessel in accordance with the direction of rotation of such vessel or bowl. Extending within the bowl and supported by a cross arm thereabove is a stationary agitator having a helical perforated blade. The inclination of the helical agitator blade is preferably the reverse of the inclination of the driving beads or ribs within the bowl or the vessel, so that while the beads or ribs tend to move the mass of material in one direction the helical agitator blade influences the mass of material in the reverse direction. It is obvious, however, that for certain heavy materials it may be desired to rotate the bowl relative to the agitator or mixing blade in such relation that the lifting action of the helical blade and that of the inclined ribs or beads will supplement each other.

The object of the invention is to simplify the structure, as well as the means and mode of operation of mechanical agitators, whereby they will not only be cheapened in construction, but will be more efficient in use, positive in operation, uniform in action, easily operated and unlikely to get out of repair.

A further object of the invention is to provide mechanical means for producing a continuous circulation within a fluid or semi-fluid body while at the same time beating or vigorously stirring the body to cause intermingling of the portions thereof.

A further object of the invention is to provide improved means for actuating such agitating or stirring mechanism and to provide an improved form of stirrer blade adapted to break up and diffuse induced currents of material, and whereby the material will be uniformly intermixed and every portion of the body of material operated upon will be uniformly affected.

A further object of the invention is to provide improved means for mounting such stirrer blade to facilitate its insertion or removal from the bowl of the vessel and to facilitate the removal of the vessel from the rotating apparatus.

With the above primary and other incidental objects in view, as will more fully appear in the specification, the invention consists of the features of construction, the parts and combinations thereof, and the mode of operation, or their equivalents, as hereinafter described and set forth in the claims.

Figure 2:
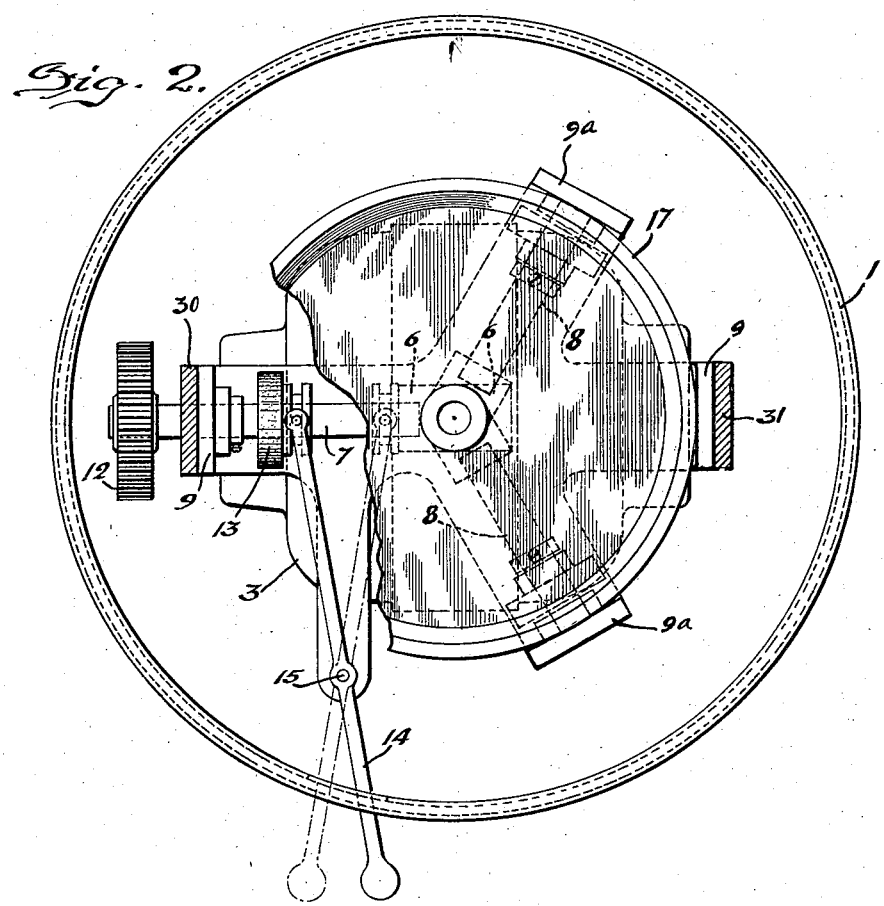
Figure 3:
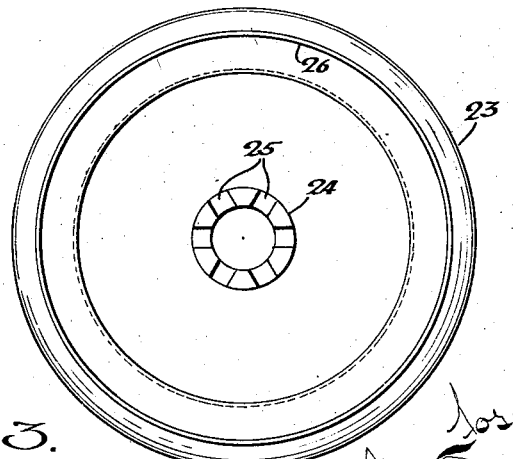

Referring to the accompanying drawings wherein is shown the preferred, but obviously not necessarily the only form of embodiment of the invention, Fig. 1 is a vertical sectional view of the assembled mixer. Fig. 2 is a plan view partly broken away of the actuating mechanism with the bowl or vessel removed. Fig. 3 is a bottom plan view of the bowl or vessel illustrating the clutch head for engagement with the rotating table.

Like parts are indicated by similar characters of reference throughout the several views.

The agitator or mixer forming the subject matter hereof, may be applied to a wide variety of usage. It is primarily designed for domestic use in the mixing of batters, mashing potatoes, the making of candies, salad dressing, and other analogous culinary or kitchen uses. It is also applicable, however, to the mixing of paints and color preparations, particularly those wherein the heavy pigments are inclined to settle, and for the mixing and compounding of pharmaceutical preparations and for the mixing of materials in manufacturing and commercial industries.

Referring to the drawings, 1 is a circular housing of sheet metal having a removable annular cover or lid 2. Located within the housing 1 is an electric motor 3. Above the motor is a yoke shaped frame 4 which for convenience has been shown mounted directly upon the frame of the motor 3, but which obviously might be otherwise supported. The frame 4 is provided with a central vertically disposed boss or hub 5 carrying in different radial positions several projecting bosses 6 in which are mounted horizontal shafts 7 and 8. These shafts are supported at their opposite ends in bearings 9 and 10 located at the ends of the yoke shaped frame 4. The shaft 7 is revoluble in its bearings 6 and 9 and constitutes the drive shaft. The shafts 8 may be either revoluble or stationary in their bearings 6 and 10. The armature shaft 11 of the driving motor 3 is operatively connected with the drive shaft 7 by a train of gears 12, by the relative proportion of which suitable speed reduction is effected. These gears may be variously proportioned to afford desired relative speeds of rotation, depending upon the material to be operated upon and the speed of the motor 3.

A sliding friction wheel 13 is splined upon the shaft 7 for unison rotation therewith but capable of to and fro adjustment of said shaft. This adjustment of the friction drive wheel 13 is effected by means of a hand lever 14 pivoted at 15 on a bracket projecting from the frame 4 and extending exteriorily of the housing 1 through a suitably located slot in the wall thereof. The shafts 8 carry corresponding idler wheels 16, which however are not slidably mounted upon the shafts, but are located adjacent to the outer ends of the shafts and are loosely journalled thereon.

Resting upon the wheels 13 and 16 is a turn table or disc 17 to which is secured a dependent shaft 18 revolubly mounted in the hub or boss 5 of the main frame 4. This shaft 18 extends somewhat below the frame 4 and is provided with a head 19 upon which bears a take up spring 20 abutting at its upper end on the under side of the frame 4. The expansive tendency of the spring 20 tends to draw the turn table shaft 18 downwardly and thereby hold the turntable or disc 17 firmly in contact with the wheels 13 and 16. The idler wheels 16 and drive wheel 16 afford a three point support for the table. The wheel 13 is preferably covered with leather or other friction material affording traction contact with the underside of the turn table. The wheels 16 are merely a support for the opposite margin of the disc to maintain its level. As the shaft 7 and wheel 13 rotate under the driving influence of the motor 3, such motion is transmitted to the turn table 17 which is rotated in unison therewith. The relative speed of rotation of the turn tables is varied by shifting the friction drive wheel 13 axially upon the shaft 7 toward and from the center of rotation of the disc or turn table 17. This shifting movement or speed regulation is effected by adjustment of the hand lever 14. The upper side of the turn table or disc 17 is provided with a hub or boss 21 through which extends a transverse pin 22 serving to secure the turn table 17 to its vertical shaft 18. The ends of the pin 22 project beyond the periphery of the hub or boss 21 and serve as clutch means for engaging a rotary bowl or vessel with the turn table. The bowl or vessel 23 rests upon the turn table 17 and rotates in unison therewith. The vessel may be of any suitable shape or proportion. Located centrally upon the bottom of the bowl 23 is a socket 24 having radially disposed notches 25 to receive the ends of the transverse pin 22 to enable the bowl or vessel to be readily engaged with the turn table in any position of relative revoluble adjustment. The projecting ends of the pin 22 co-acting with the notched walls of the socket or hub 24 afford a detachable driving clutch between the bowl or vessel and the turn table. In order that the vessel may sit upright when removed from the turn table a base flange 26 is provided. Obviously spaced feet or legs may be employed in lieu of a base flange 26 as shown by dotted lines at 26ª.

The margin of the turn table 17 is provided with a beveled flange 27 within which the base 26 of the bowl or vessel rests. The beveled flange serves to guide and center the bowl relative to the turn table, thus facilitating the interengagement of the co-acting clutch elements.

Upon its interior the rotary bowl or vessel 23 is provided with a series of inclined or helical ribs 29. These ribs projecting inwardly from the wall of the vessel afford a driving influence upon the mass of material contained within the vessel to insure the unison rotation of the material. Due to their inclination or helical disposition, the inwardly projecting inwardly inclined ribs 29 will have an elevating or a depressing effect upon such mass of material according to the direction in which such ribs are inclined in relation to the direction of rotation of the vessel. That is to say, the ribs 29 not only cause the body of material contained within the bowl or vessel 23 to rotate in unison with the rotation of the vessel, but they will induce an upward or downward flow or current within such body of material according to the direction and inclination of the ribs and the relative rotation of the barrel.

Secured to the frame yoke 4 and projecting upwardly at opposite sides of the turn table 17 are spaced struts 30 and 31. These struts are connected at their upper ends by a cross arm 32. The manner of connecting the cross arms to the struts is immaterial. However, in the present instance, the cross arm 32 has been hinged to the upper end of the strut 30. At its opposite end it is detachably engaged with the strut 31 by a spring latch finger 34. The cross arm 32 is provided with a medial ball bearing hub 33 engaging the vessel cover to hold it in closed position during operation.

Mounted on the cross arm 32 for vertical reciprocatory movement, but non-revoluble movement, is a vertically disposed stem or shaft 35 carrying a mixer or stirrer blade 36. This stirring blade may be of any suitable or approved form according to the character of the material being operated upon. It is preferably of helical or inclined formation which will tend to lift the material operated upon from the bottom of the vessel inducing an upward movement or flow thereof. Preferably, though not necessarily, the inclination of the stirring blade or agitator 36 is in reverse relation to that of the blade or ribs 39 so that as the bowl or vessel is rotated the stirring blade and the ribs influence the material operated upon in opposing directions. This induces a more thorough agitation and intermixture of the material. The agitator or stirring blade 36 is held stationary within the vessel or bowl 23 while the latter rotates thereabout in unison with the turn table 17. To facilitate the introduction and withdrawal of the mixing blade 36 and to facilitate the removal of the bowl or vessel from the turn table the blade is drawn upwardly within the vessel by means of the knob 37 on the upper end of the stem or shaft 35 whereupon the free end of the cross arm is unlatched from the strut 31 and the cross arm and stirring blade are oscillated upwardly about the pivotal connection of the cross arm with the strut 30. The stem or shaft 35 is preferably provided with indentations for engagement of a spring actuated detent 39 by which the agitator or mixer blade 36 may be yieldingly held in either its depressed or retracted position.

From the above description it will be apparent that there is thus provided a construction of the character described, possessing the particular features of advantage before enumerated as desirable, but which obviously is susceptible of modification in its form, proportions and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a mixing apparatus, a rotary vessel, actuating means for rotating the vessel, an agitator within the vessel, variable speed means operatively connecting the vessel and actuating means, and a support for said agitator in which the agitator is held against rotation, and a lid for the vessel carried by the support.

2. In a mixing apparatus, a rotary vessel, means for rotating the vessel, an agitator within the vessel and a vertically swinging support in which said agitator is mounted for reciprocatory motion, and detent means for maintaining said agitator in different positions of adjustment relative to the swinging support.

3. In a mixing apparatus, an actuator, a rotary vessel, variable speed driving means for rotating the vessel, and means for adjusting such variable speed driving means to vary the speed of the vessel independent of variation of the speed of the actuator and a nonrevoluble vertically adjustable agitator located within the vessel.

4. In a mixing apparatus, a revoluble vessel, means for rotating the vessel including a revoluble turntable on which the vessel removably rests, a series of radially disposed supporting rollers for the turntable, spring tensioned means for yieldingly holding the turntable in engagement with said rollers, one of said rollers being axially adjustable in a radial direction relative to the turntable, means for driving said roller, means for adjusting said roller relative to the turntable while in operation to vary the speed of the turntable and vessel, a lid for the vessel, a stationary agitator within the vessel, a stem for said agitator extending through an opening in the lid of the vessel, and a support with which the agitator stem is engaged to support the agitator in upright position within the vessel.

5. In a mixing apparatus, a revoluble vessel, means for rotating the vessel, a lid for the vessel, a stationary agitator within the vessel, a stem for said agitator extending through an opening in the lid of the vessel, and a support with which the stem of the agitator is slidingly engageable for vertical adjustment relative thereto, independently of the lid but holding said agitator against revoluble movement.

6. In a mixing apparatus, a revoluble vessel, means for rotating the vessel, an agitator located within the vessel, a support therefor holding the agitator in upright position and against rotation, including a transverse supporting bar, a stem for said agitator having sliding but nonrevoluble bearing in said supporting bar and detent means engageable with said agitator stem for supporting the agitator in different positions of vertical adjustment relative to the vessel and supporting bar.

7. In a mixing apparatus, a revoluble vessel, means for rotating the vessel, a nonrevoluble agitator located therein, and a vertically swinging supporting bar located above the vessel with which the agitator is slidingly engageable for initial vertical adjustment and subsequent lateral swinging motion relative to the vessel.

8. In a mixing apparatus, a revoluble vessel, means for rotating the vessel, a nonrevoluble agitator located therein, and a transverse relatively movable supporting bar located above the vessel, and a closure lid for said vessel mounted upon and movable with said supporting bar.

9. In a mixing apparatus, a vessel having a convex bottom, supporting legs adapted to maintain the vessel in upright position, and a revoluble support, and interengaging clutch means between the vessel and revoluble support for rotating the vessel.

10. In a mixing apparatus, a driving member, a main frame, a revoluble turn table, a central trunnion upon which the turntable is revoluble, a series of radially disposed rollers upon which the turn table rests, a spring having operative engagement with the trunnion of the turn table for drawing the table into intimate engagement with the rollers, one of said rollers being axially adjustable in a radial direction relative to the turn table, said adjustable roller being operatively connected with the driving member for transmitting motion to the turn table, a vessel removably supported upon the turn table, interengaging clutch elements for interconnecting the table and vessel for unison rotation, a stirring element located within the vessel, and means for holding such element stationary therein during the rotation of the vessel.

11. In a mixing apparatus of the type described, a vessel having a convex bottom, supporting legs for the vessel, a rotary carrier therefor interengaging clutch members upon the rotary carrier and upon the vessel for engaging said members for unison rotation when the vessel is supported thereon, means for rotating the carrier, and an agitator located within the vessel.

12. In a mixing apparatus of the type described, a rotary vessel, means for rotating the vessel, the walls of the vessel being fluted in an upwardly direction, a reversely inclined stationary agitator about which the vessel rotates, and means for supporting the agitator.

13. In a mixing apparatus, a rotary vessel, means for rotating the vessel, and a succession of helically arranged flutes formed on the wall of the vessel and a stationary agitator having helical arranged blades, the flutes of the vessel and the blades of the agitator being reversely disposed whereby they tend to influence the movement of the contents of the vessel in different directions.

14. In a mixing apparatus, a rotary vessel, means for rotating the vessel, the walls of the vessel being fluted in an inclined direction, a stationary inclined agitator within the vessel and means for rotating the vessel in such direction that the influence of the inclined fluted walls of the vessel and the inclined agitator will be in opposition one to the other.

15. In a mixing apparatus, a vessel, a helical agitator within the vessel, the walls of the vessel being helically fluted, and means for relatively rotating said members in reverse relation in relation one to the other.

16. In a mixing apparatus, a vessel, a helical agitator within the vessel, the walls of the vessel being helically fluted, and means for relatively rotating said members in relation one to the other, the direction of the helices of the agitator and vessel fluting and direction of relative rotation being such that material within the vessel is influenced in one direction by the fluting and in the other direction by the helical contour of the agitator.

17. In a mixing apparatus, a rotary vessel having fluted walls, a stationary helical agitator within the vessel and means for rotating the fluted vessel about said agitator in such direction that the influence of the fluted walls upon the contents of the vessel will be in opposition to the influence of the helical agitator thereon.

In testimony whereof, I have hereunto set my hand this 17th day of April, A. D. 1928.

JOSEPH F. GOETZ.